US005932982A

United States Patent [19]

Pezzelli, Jr.

[11] Patent Number: 5,932,982

[45] Date of Patent: Aug. 3, 1999

[54] APPARATUS FOR AUTOMATICALLY OPENING A LID

[76] Inventor: Edward Pezzelli, Jr., 249 Elmdale Rd., North Scituate, R.I.

[21] Appl. No.: 08/938,231

[22] Filed: Sep. 26, 1997

Related U.S. Application Data

[60] Provisional application No. 60/027,379, Sep. 26, 1996.

[51] Int. Cl.[6] .......... G05B 5/00

[52] U.S. Cl. .......... 318/480; 318/3; 318/9; 318/10; 318/16; 49/25; 49/26; 49/29; 49/31

[58] Field of Search .......... 318/480, 3, 9, 318/10, 16, 285; 248/147; 49/25, 26, 29, 31, 139, 140, 158; 250/559.12

[56] References Cited

U.S. PATENT DOCUMENTS

| | | | |
|---|---|---|---|
| 4,621,452 | 11/1986 | Deeg | 49/28 |
| 4,996,467 | 2/1991 | Day | 318/480 |
| 5,329,212 | 7/1994 | Feigleson | 318/16 |
| 5,770,935 | 6/1998 | Smith et al. | 318/480 |

*Primary Examiner*—William M. Shoop, Jr.
*Assistant Examiner*—Rita Leykin
*Attorney, Agent, or Firm*—Galgano & Burke

[57] ABSTRACT

A trash enclosure includes a bay with a moveable lid and a sensor attached to the inner periphery of the bay. The moveable lid attaches to the enclosure and moves between an open position and a closed position to cover the bay. Upon detection of an object within the bay, the sensor causes the lid to open. Accordingly, the inner periphery shields the sensor to inhibit detection of objects beyond the inner periphery.

26 Claims, 5 Drawing Sheets

FIG.−1

APPARATUS FOR AUTOMATICALLY OPENING A LID

RELATED APPLICATION

This application claims the benefits of U.S. Provisional Application No. 60/027,379 filed on Sep. 26, 1996.

BACKGROUND OF THE INVENTION

1. Field of the Invention

This invention relates to trash enclosures and more particularly to trash enclosures having an automatic lid.

2. Previous Art

Trash enclosures may hold trash of all types. Trash may include household garbage, restaurant garbage, medical waste, chemical waste, and other industrial waste. Enclosures may partially or fully enclose trash depending on the type of trash to be enclosed. Trash enclosures often have lids which open to receive trash and close to contain odor, hide trash from view and prevent the trash from contaminating areas beyond the enclosure.

Lids are often opened by hand. Hand opened lids have several problems. In some cases, contact between a hand and the lid may spread contamination. Additionally, sometimes a free hand may not be available to open the lid.

Medical workers and food handlers, for example, may not wish to contact trash containers to avoid biological contamination. Similarly, chemical workers may not wish to contact a container such as a trash enclosure which holds chemical contaminants. Contact with any potentially contaminated container is undesirable.

In fast food restaurants, food is often served on trays. Upon finishing a meal, the trays are carried to a trash container where the trash is dumped and the tray deposited. Fast food wrappers and other waste may fly off of the tray when being dumped into the container. Two hands may be necessary to carry and dump such a tray without spilling the waste. It can be appreciated that a free hand is not always available for opening the lid and waste may spill as a result. In particular, trash may spill if the lid is not properly held open because the lid may push the trash off of the tray. This situation may be observed at many fast food restaurants which have hand operated trash enclosure lids. Such spills are sought to be avoided.

In order to facilitate insertion of trash into a trash enclosure, automatically operable lids have been developed. Such automatically operable lids may be fitted with a sensor system which automatically opens the lid upon demand. Ideally, such enclosures will eliminate the need for pushing the lid open by hand. An example an enclosure having a sensor is described in U.S. Pat. No. 4,981,275 to Sheu, the disclosure of which is incorporated herein by reference.

The Sheu invention relies upon a sensor mounted on the face of the trash enclosure. The sensor detects objects in front of the enclosure and causes the lid to open in response to detection of an object. Accordingly, a passerby may inadvertently activate the sensor and cause the lid to open. Inadvertent opening of the lid may unnecessarily release odor and contaminants from the trash enclosure. Accordingly the lid should not be inadvertently opened.

Photoelectric eyes may rely on visible light. When visible light is relied upon, the sun and other light sources could interfere with the operation of the sensor. What is desired is an enclosure having a sensor which does not mistakenly activate due to interference with visible light sources, the presence of passers by, or other causes.

SUMMARY OF THE INVENTION

It is an object of this invention to provide a trash enclosure having an automatic lid.

It is a further object of the invention to provide a trash enclosure having a sensor for opening a lid where the enclosure shields the sensor.

It is a further object of the invention to provide an enclosure which may be retrofit onto existing trash containers.

The present invention includes a trash enclosure having a bay for receiving objects and an automatically opening lid. A sensor causes the lid to open when an object is detected in the bay. The bay shields the sensor so that the sensor will not mistakenly detect objects beyond the bay.

In accordance with the above objects and those which will be apparent below, one embodiment of the present invention comprises an apparatus for opening a lid, comprising: an enclosure having at least one wall having an inner periphery which defines a bay; a moveable lid attached to the enclosure, the lid being moveable between an open position and a closed position relative to the bay; a mechanism for detecting an object within the bay; and a mechanism for opening the lid in response to detection of the object.

Another object of the present invention is to provide an apparatus wherein the inner periphery of the wall portion is disposed to shield the sensing mechanism to inhibit detection of objects beyond the bay. Moreover, another object of the invention is to provide an apparatus wherein the sensing mechanism is secured along the inner periphery of the bay.

In one embodiment of the present invention, the bay includes a front edge and a top edge. The sensor is recessed from one of the edges by a distance within the range of about 0.001 inches to about 6 inches such that the edge shields the sensor. In a variation of this embodiment, the sensor is recessed from one of the edges by a distance within the range of about 0.5 inches to about 4 inches.

In another embodiment, the enclosure includes a cover which attaches on a trash can.

In yet another embodiment, the enclosure includes a motor unit having motor with at least one movable arm, and at least one cable. The motor attaches to the enclosure and couples with the sensor to enable the sensor to activate the motor. The cable attaches to the lid and to the movable arm so that the sensor activates the motor to move the arm and draw the cable to open the lid. The cable enables the lid to be opened by hand and closed by gravity such as when power is not available.

In one embodiment, the motor unit includes a mechanism for activating and deactivating the motor to open and close the lid, e.g., a switch supplies power to the motor to open and hold open the door when the sensor is activated and cuts off the power to close the lid when the sensor returns to its ready state.

In another embodiment the motor includes limit switches. One limit switch engages the arm when the lid is in the open position. The other limit switch engages the arm when the lid is in the closed position. The limit switches couple with the motor to deactivate the motor when the lid is in the open position and when the lid is in the closed position.

It is an advantage of the present invention to provide a trash enclosure having a lid which minimizes the mistaken opening of the lid.

It is a further advantage of the invention to provide an apparatus for opening a lid which may be retrofitted on existing trash cans.

BRIEF DESCRIPTION OF THE DRAWINGS

Other objects and features of the present invention will become apparent from the following detailed description considered in connection with the accompanied drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE INVENTION

Figure 1:
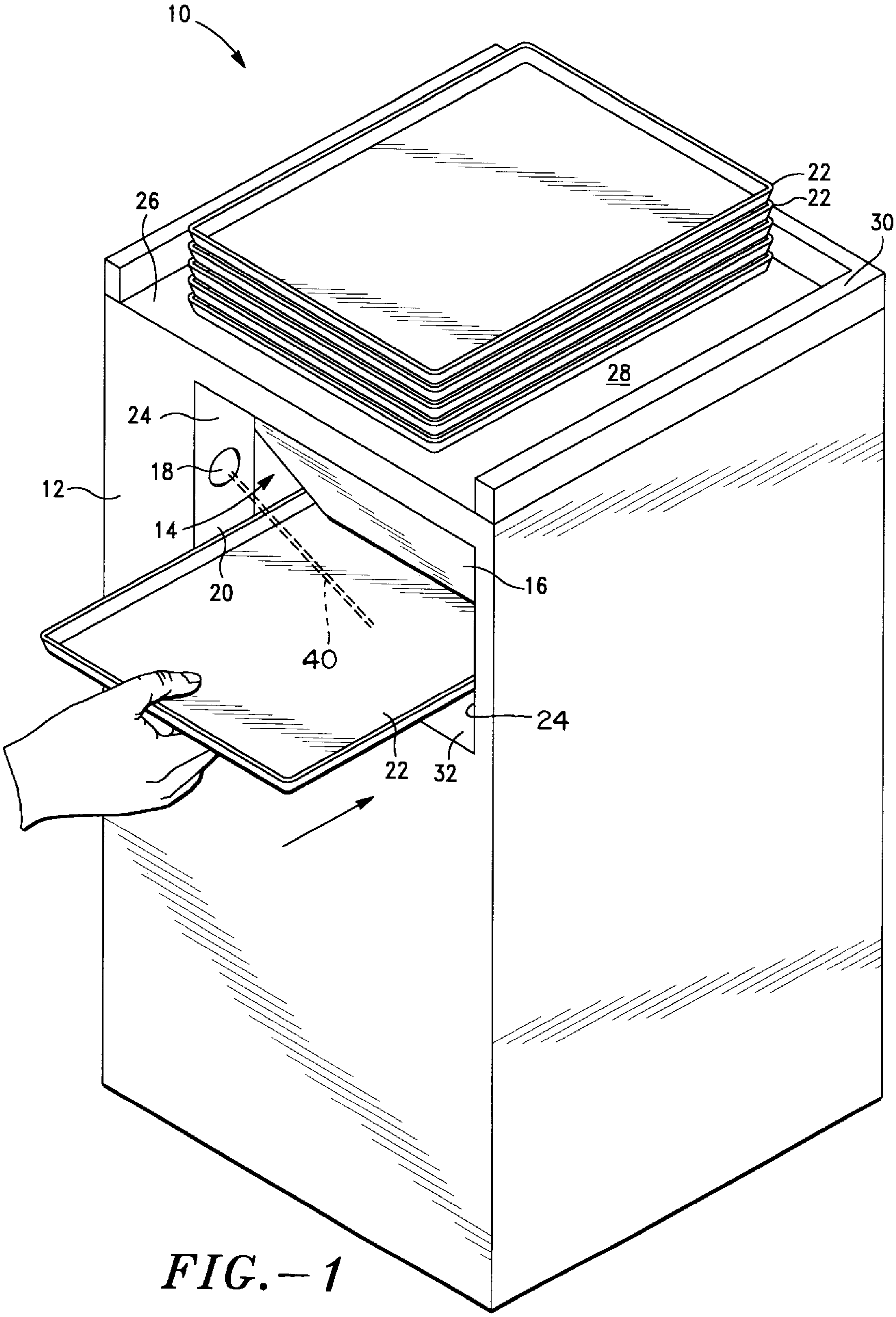
FIG. 1 shows a perspective view of the present invention with a sensor mounted along a side edge of a receiving bay with a tray shown breaking the sensor barrier causing movement of the trash lid.

Turning now to the figure drawings and in particular FIG. 1 which shows a trash enclosure generally designated by reference numeral 10. The trash enclosure 10 comprises a cabinet 12 having a bay 14, a moveable lid 16 and a sensor 18. The lid 16 is shown open, but closes to cover the bay 14. When lid 16 is closed, sensor 18 detects objects within bay 14, e.g., trash, and causes lid 16 to automatically open and receive the trash.

Figure 6:
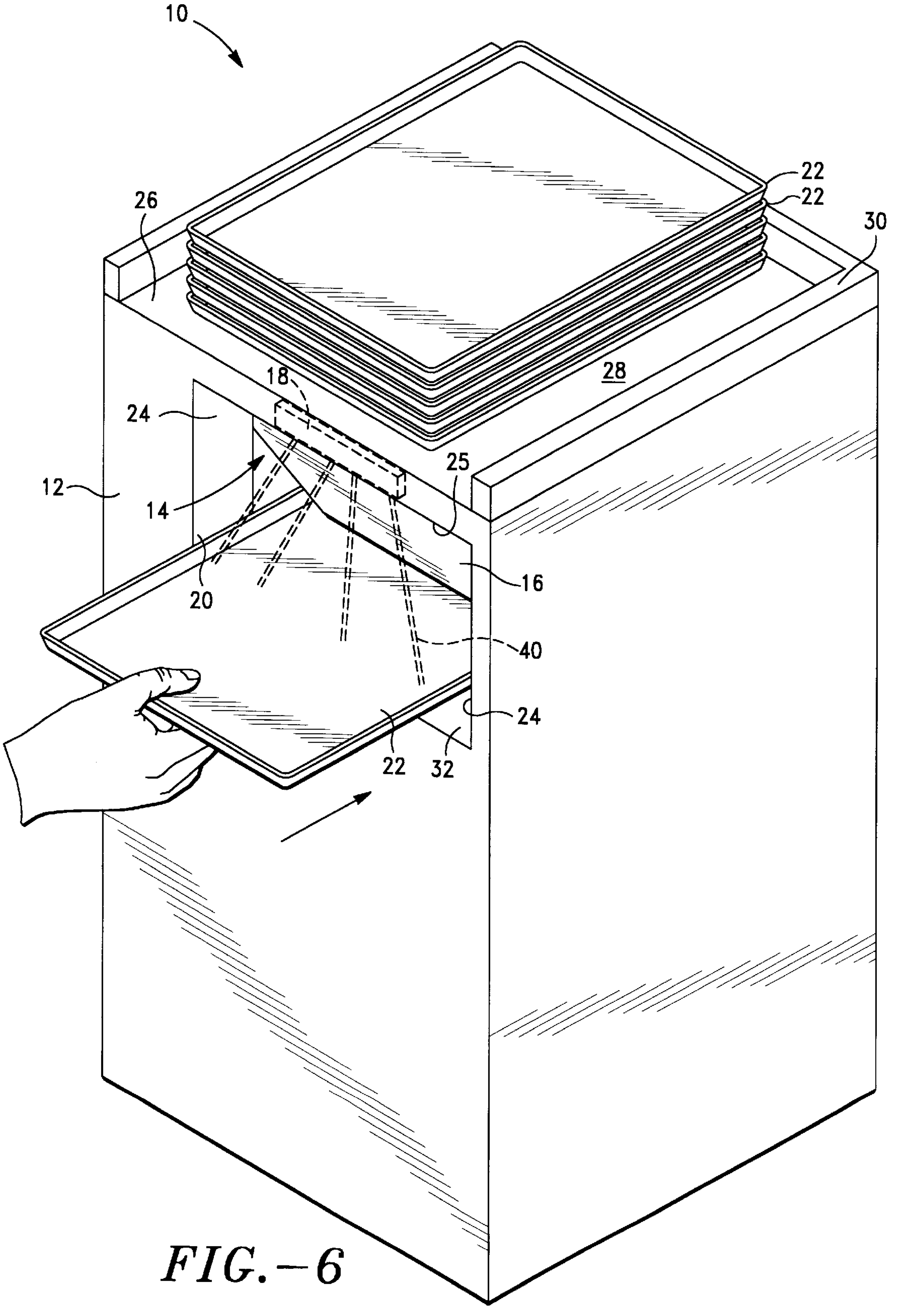
FIG. 6 is a perspective view of another embodiment of the present invention with the sensor mounted on the top edge of the receiving bay.

The enclosure has at least one wall having an inner periphery 20 which defines bay 14. Preferably, the sensor 18 mounts on the inner periphery 20 of bay 14, e.g., along front edge 24 or top edge 25 (See FIG. 6). However, in some cases, it may be preferable to mount sensor 18 on lid 16. As can be appreciated, mounting sensor 18 within bay 14, e.g., along inner periphery 20 inhibits inadvertent detection of objects which are located outside bay 14.

In one particular embodiment, e.g., the embodiment shown in FIG. 1, sensor 18 is recessed from front edge 24 which enables bay 14 to shield sensor 18 from objects which are located beyond the bay 14. In another embodiment, it may be preferable to mount sensor 18 along top edge 25 (or a portion of the same) for manufacturing and/or cosmetic purposes (See FIG. 6).

Preferably, cabinet 12 is formed as a single unit and comprises a top 26 having a flat surface 28 for holding multiple trays 22. Advantageously, top 26 comprises a ridge which cooperates with flat surface 28 to prevent trays 22 from sliding off cabinet 12. Accordingly, when the restaurant patron finishes eating, tray 22 and trash are inserted into bay 14. Sensor 18 detects the trash and tray 22 in bay 14 and automatically opens lid 16 so that a patron may dump the trash into cabinet 12. Thereafter, the now empty tray 22 is removed from bay 14 and stacked on flat surface 28 on top 26 of cabinet 12.

Bay 14 also comprises a bottom ledge 32. As can be appreciated, the provision of bottom ledge 32 will result in consistent positioning of the tray 22 atop the bottom ledge 32 and within bay 14 which, in turn, will enable sensor 18 to consistently and correctly detect objects entering trash enclosure 10.

Figure 2:
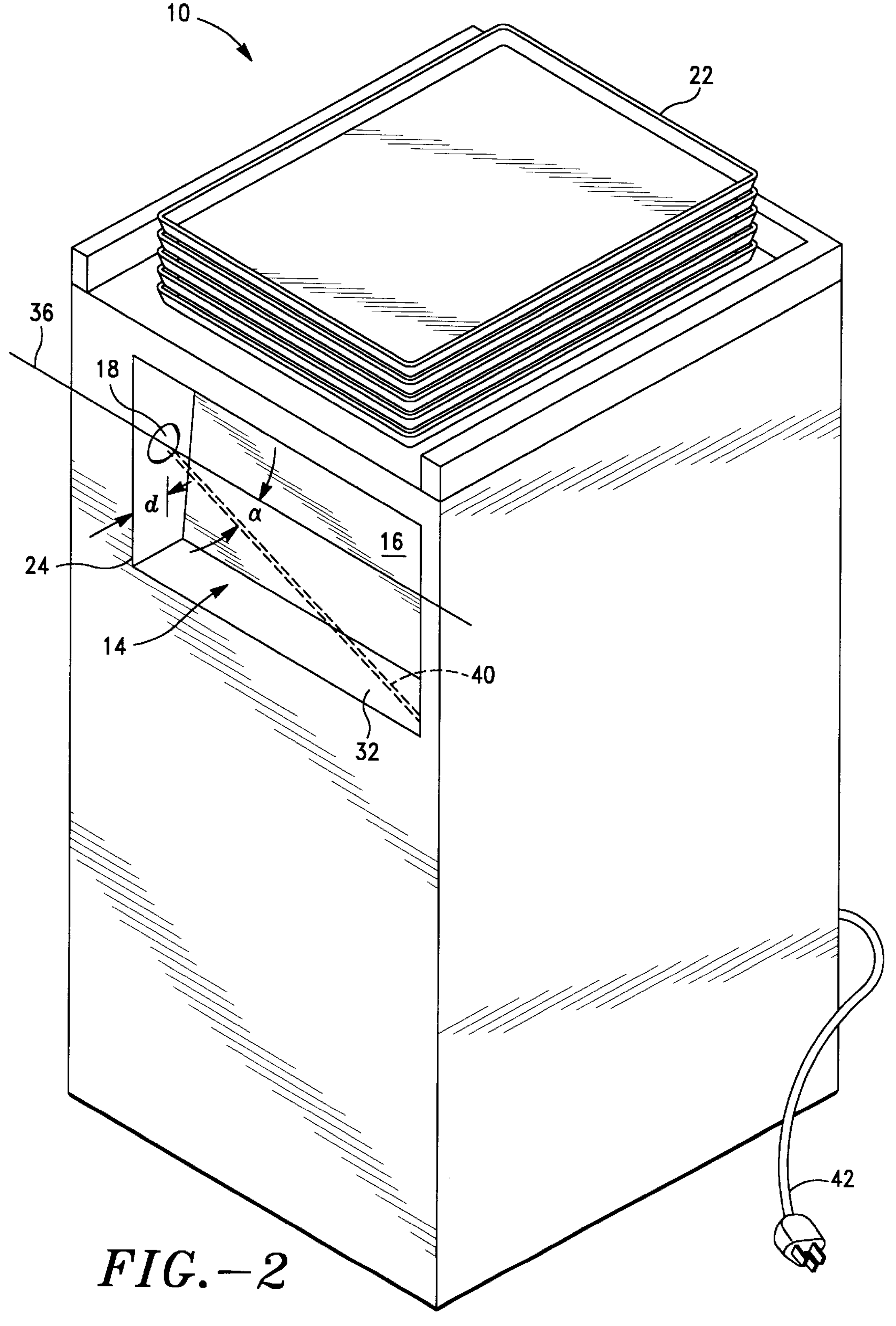
FIG. 2 is a perspective view of the embodiment of FIG. 1 showing the trash lid in closed position and the sensor in an idle or ready state.

FIG. 2 shows sensor 18 directing a stream of infrared spectrum light 40 from sensor 18 across bay 14. More particularly, sensor 18 directs light 40 at an angle $\alpha$ from the horizontal line 36 (See FIG. 2). Preferably, sensor 18 is powered via an A/C power source. A power cord 42 connects sensor 18 to the A/C power source. It can be appreciated, however, that the present invention may be adapted for use with a DC power source or in some instances it may be desirable to use a portable power source, e.g., a battery.

Advantageously, sensor 18 includes an infrared photoelectric sensor which generates infrared light and senses reflected infrared light. Use of an infrared light sensor prevents visible light from interfering with the sensor's 18 operation. In a preferred embodiment, sensor 18 includes an ALLEN BRADLEY diffuse type photoelectric sensor. It can be appreciated, however, that various other sensors 18 may be used in accordance with the present invention including sensors 18 which rely on motion, sound, magnetism and/or various other ways of sensing nearby objects.

In one embodiment, sensor 18 mounts on one side of the bay 14, e.g., along top edge 25 or front edge 24. Preferably, light 40 of sensor 18 is directed towards an opposing side of bay 14 and generally towards bottom ledge 32 at the angle $\alpha$. Advantageously, inner periphery 20 includes a coating of infrared absorptive material to minimize reflection of the infrared light. Preferably, this coating is mat black V-32 laminent.

In one particular embodiment, the angle $\alpha$ is within a range of about 0 degrees to about 55 degrees. In a variation of this embodiment, the angle $\alpha$ is between 10–45 degrees. In another variation of this embodiment, the angle $\alpha$ is within a range of about 20 degrees to about 30 degrees.

Preferably, sensor 18 is recessed a distance "d" from front edge 24 (or the top edge 25). In one embodiment, sensor 18 is recessed from the front edge 24 at a distance within a range of about 0.001 inches to about 6 inches. In another embodiment, sensor 18 is recessed from front edge 24 by a distance within a range of about 0.5 inches to about 4 inches. As can be appreciated, recessing sensor 18 in this manner enables the inner periphery 20 of the bay 14 to shield sensor 18 from sources of infrared light which may be mistakenly detected by sensor 18. Although in this particular embodiment sensor 18 is recessed to prevent unwanted detection, it is not beyond the scope of this invention to provide other ways of shielding sensor 18 to minimize detection of objects beyond the bay 14.

Figure 3:
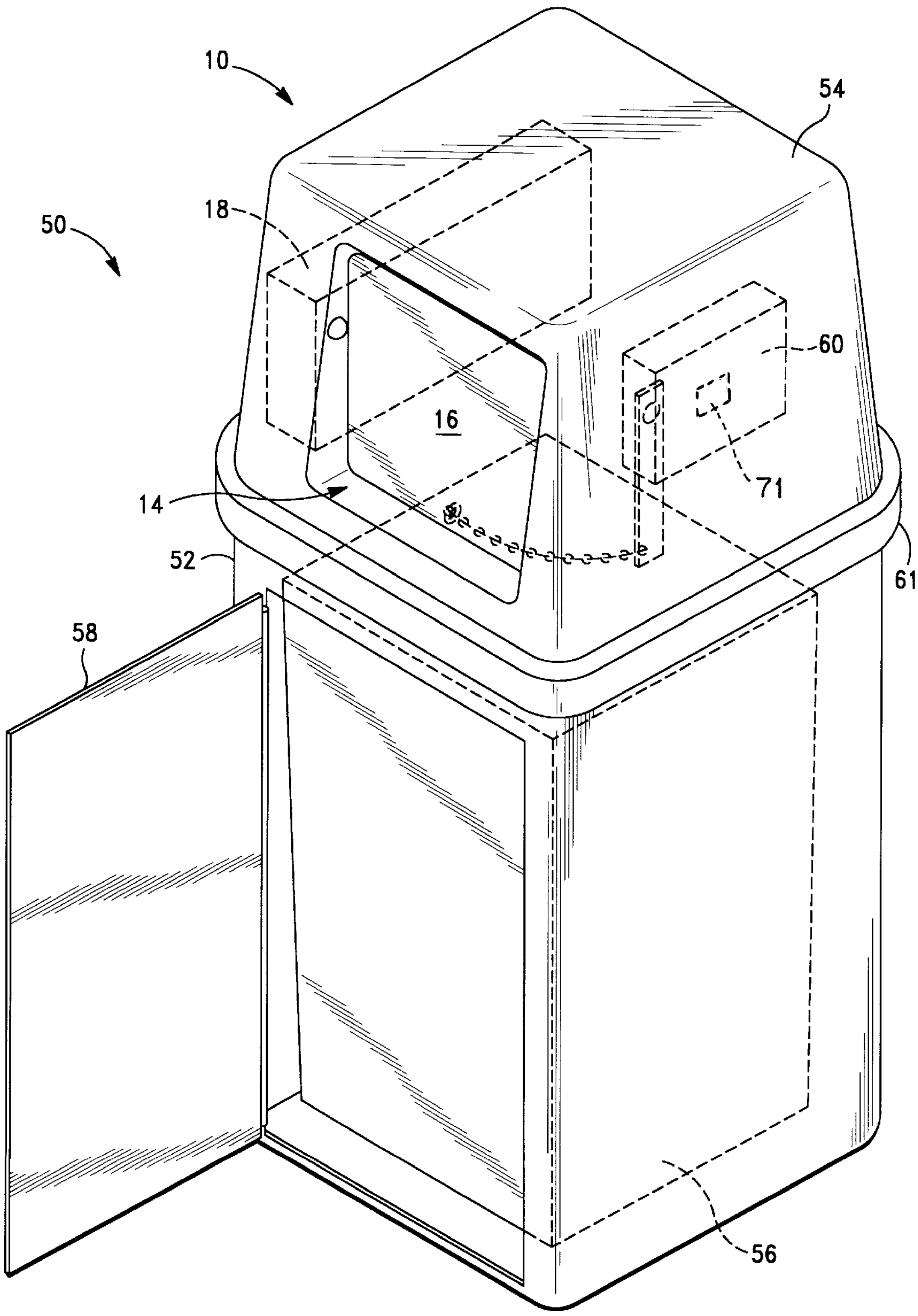
FIG. 3 is a perspective view of the present invention showing an example of the internal positioning of the lid motor and the sensor unit (shown in phantom)

FIG. 3 shows another trash enclosure generally designated with the reference numeral 50. Trash enclosure 50 comprises a cabinet 52, a cover 54, a can 56 and a sensor 18.

Preferably, cover 54 removably attaches to cabinet 52 to enable cleaning and maintenance of the trash enclosure 50. The cover 54 of the enclosure 10 defines a base rim 61 which is mountable on cabinet 52, over the trash can 56. Advantageously, the base rim 61 seals against cabinet 52. As shown in the drawings, cabinet 52 preferably comprises a swinging door 58 to enable removal and replacement of can 56 therefrom, e.g., when can 56 is full. As can be appreciated, when the lid 16 closes, the lid seals against the cover 54 and helps to reduce unwanted odor.

Advantageously, motor unit 60 attaches to cover 54 and cooperates with sensor 18 to enable patron to activate motor 60 and open lid 16 in response to a signal from the sensor 18.

In one embodiment, sensor 18 attaches to cover 54 of trash enclosure 50 to enable existing trash enclosures to be adapted with a cover having a sensor 18 and a motor unit 60. Accordingly, existing trash enclosures may be retrofitted with an automatic lid.

Figure 4:
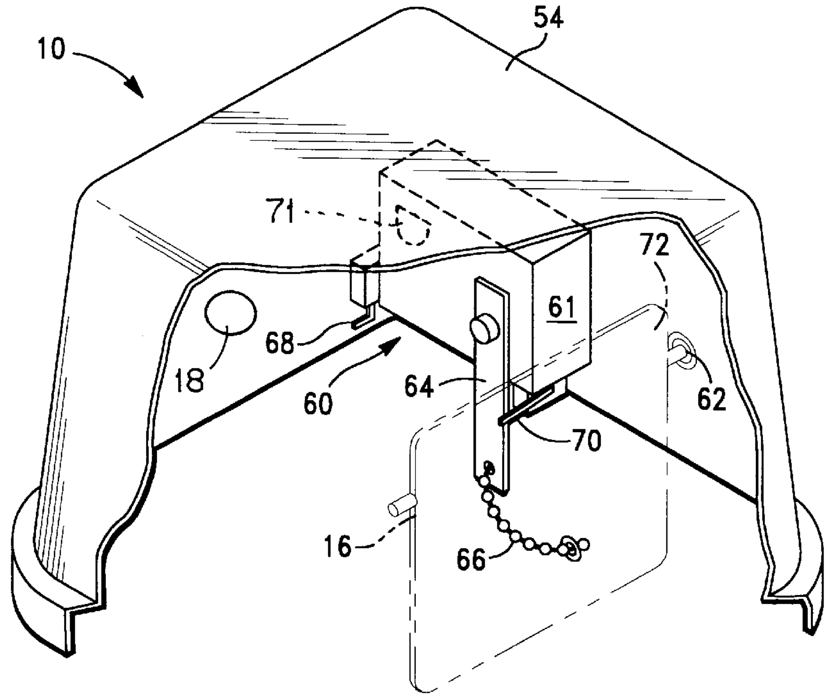
FIG. 4 is a broken perspective view of the trash enclosure showing the motor and the lid door in closed position.

FIG. 4 shows cover 54 and motor unit 60 with a hinge 62 which movably attaches lid 16 to cover 54. Preferably, cover 54 suspends lid 16 in a vertical position to close lid 16, however, lid 16 may be opened by hand and closed by gravity such as when power is not available.

Preferably, motor unit 60 includes an electric motor 61, at least one movable arm 64, at least one cable 66, and an open limit switch 68 and a closed limit switch 70. Cable 66 attaches to lid 16 and to movable arm 64 to open lid 16 when motor 61 is activated by sensor 18. In one particular embodiment, motor unit 60 includes a mechanism 71 which supplies power to motor 60 to open and hold open lid 16 once sensor 18 is activated and cuts off power once sensor 18 returns to its idle or ready state, e.g., a solenoid switch.

Advantageously, arm 64 engages the open limit switch 68 when lid 16 is in the open position (See FIG. 5) and engages the close limit switch 70 when lid 16 is closed. Preferably, limit switches 68 and 70 couple with motor 61 to deactivate the motor when the lid is in the open position and when the lid is in the closed position. In one embodiment, motor 61 comprises a delay mechanism (not shown) which holds lid 16 open for a predetermined period after activation of open limit switch 68 to enable a user to deposit trash into the trash enclosure 10. Preferably, the predetermined period is within a range of about 1 second to about 15 seconds. Advantageously, lid 16 remains open when an object is in the bay 14 (FIG. 1).

In one embodiment, sensor 18 includes a delay timer (not shown) that causes lid 16 to remain open for a predetermined period after sensor 18 activates motor 61. The sensor 18 may include an adjustment to adjust the predetermined period as desired.

Preferably, lid 16 has a top portion 72 with at least one hinge 62 which is movable attached to enclosure 10 to suspend lid 16 and to enable lid 16 to rotate between the open and the closed positions. Advantageously, lid 16 is normally suspended in the closed position where the arm 64 contacts the closed limit switch 70 which deactivates the motor.

Figure 5:
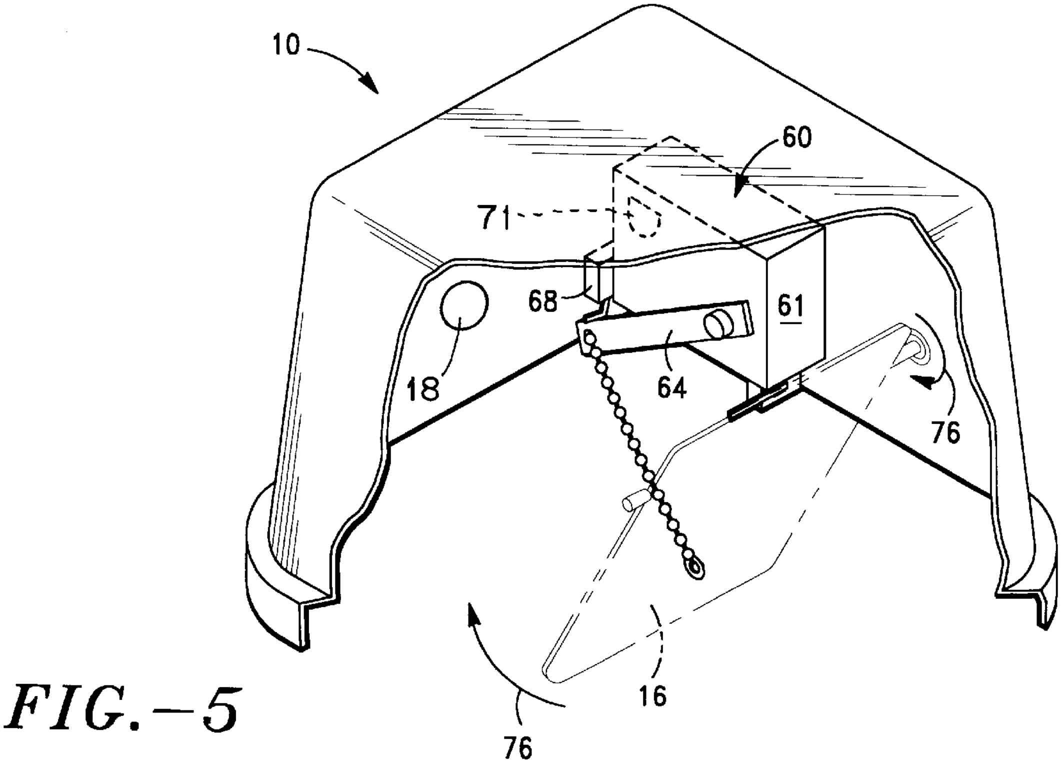
FIG. 5 is a broken perspective view of the trash enclosure showing the movement of the motor arm and the lid door when the sensor is activated.

FIG. 5 shows lid 16 rotated into the open position. Preferably, lid 16 rotates in the direction of the arrows 76. In the open position, arm 64 contacts the open limit switch 68 to deactivate the motor.

Although several embodiments of the present invention have been described herein, it can be appreciated that numerous other ways of accomplishing the objects of the invention may be devised. For example, the motor unit may be replaced by many types of lid opening devices. Sensor 18 may detect in other ways, e.g., with various bands of the electromagnetic spectrum, by magnetism, and/or by sound.

The trash enclosure may assume any of a variety of geometric shapes and may be configured for enclosing numerous types of refuse. The enclosure may fully, or only partially enclose trash. The present invention is useful with any container and it should not be implied that the present invention is solely limited to trash containers. Further, the placement of the sensor 18 can vary. For example, the sensor 18 can be mounted anywhere within bay 14, e.g., in some cases it may be desirable to mount sensor 18 on lid 16.

With these variations in mind, the invention is to be limited only by the claims as set forth below.

I claim:

1. An apparatus for opening a lid, comprising:

an enclosure having at least one wall having an inner periphery which defines a bay;

a moveable lid attached to said enclosure, said lid being moveable between an open position and a closed position relative to said bay;

means for detecting an object within said bay; and means for opening said lid in response to detection of said object.

2. An apparatus as set forth in claim 1, wherein said inner periphery of said wall portion is disposed to shield said sensing means to inhibit detection of said objects beyond said bay.

3. An apparatus as set forth in claim 1 wherein said sensing means is secured along said inner periphery of said bay.

4. An apparatus as set forth in claim 1, wherein said bay comprises a front edge, said sensor being recessed from said front edge by a distance within a range of about 0.001 inches to about 6 inches.

5. An apparatus as set forth in claim 1, wherein said bay comprises a front edge, said sensor being recessed from said front edge by a distance within a range of about 0.5 inches to about 4 inches.

6. An apparatus as set forth in claim 1, wherein said enclosure compromises a cover which attaches on a trash can.

7. An apparatus as set forth in claim 1, wherein said enclosure comprises a cabinet.

8. An apparatus as set forth in claim 1, wherein said enclosure comprises a motor unit having a motor with at least one movable arm and at least one cable, said motor attaches to said enclosure and couples with said sensor to enable said sensor to activate said motor, said cable attaches to said lid and to said at least one movable arm, whereby, activation of said motor rotates said at least one movable arm and draws said at least one cable to open said lid.

9. An apparatus as set forth in claim 8, wherein said motor unit comprises at least two limit switches, one of said at least two limit switches being engagable with said arm when said lid is in said open position, another of said limit switches being engagable with said arm when said lid is in said closed position, whereby each of said at least two limit switches couple with said motor to deactivate said motor when said lid is in said open position and when said lid is in said closed position.

10. An apparatus as set forth in claim 1, wherein said lid comprises a top portion with at least one hinge, said at least one hinge attaches to said enclosure to suspend said lid and to enable said lid to rotate between said open position and said closed position, whereby, said lid, normally suspended in the closed position by gravity, is hand openable for use when power is unavailable.

11. An apparatus as set forth in claim 1, wherein said sensor comprises an infrared photoelectric sensor which generates infrared light and senses reflected infrared light to minimize sensor interference with visible light.

12. An apparatus as set forth in claim 1, wherein said bay comprises a top edge and a front edge and said sensor is mounted along at least one of said edges.

13. An apparatus as set forth in claim 11, wherein said inner periphery comprises a coating of infrared absorptive material to minimize reflection of said infrared light.

14. An apparatus as set forth in claim 1, wherein said sensor comprises a delay timer that causes said lid to remain open for a predetermined period after said sensor activates said lid.

15. An apparatus as set forth in claim 14, wherein said predetermined period is within a range of about 1 second to about 15 seconds.

16. An apparatus as set forth in claim 14, wherein said predetermined period is adjustable.

17. An apparatus as set forth in claim 1 wherein said opening means comprises a solenoid switch.

18. A cover for a trash enclosure, comprising:

an enclosure having a bay, said bay defines an inner periphery, said enclosure defines a base rim which is mountable over a trash enclosure;

a moveable lid attached to said enclosure, said lid being moveable between an open position and a closed position;

a sensor attached to said inner periphery for detecting an object within said bay;

a motor mounted on said enclosure, said motor opens said lid in response to detection of said object, whereby, said inner periphery shields said sensor to inhibit detection of objects beyond said inner periphery.

19. A cover as set forth in claim 18, wherein said bay comprises a bottom ledge, a top edge and two opposing sides, said sensor mounts on one of said sides and directs infrared light across said bay towards said bottom ledge and said opposing side.

20. A cover as set forth in claim 18, wherein said sensor mounts on said top edge and directs infrared light across said bay towards said bottom ledge and at least one of said opposing sides.

21. A cover as set forth in claim 19, wherein said infrared light is directed at an angle $\alpha$, wherein said angle $\alpha$ is within a range of about 0 degrees to about 55 degrees.

22. A cover as set forth in claim 19, wherein said infrared light is directed at an angle $\alpha$, wherein said angle $\alpha$ is within the range of about 10 degrees to about 45 degrees.

23. A cover as set forth in claim 19, wherein said infrared light is directed at an angle $\alpha$, wherein said angle $\alpha$ is within the range of about 20 degrees to about 30 degrees.

24. A trash enclosure which opens automatically upon detection of an object, comprising:

a can for holding garbage;

an enclosure mounted over said can and having a bay, said bay defines an inner periphery, said inner periphery includes a plurality of edges;

a moveable lid attached to the enclosure, said lid being moveable between an open position and a closed position;

a motor for moving said lid; and an infrared photoelectric sensor attached to said inner periphery along one of said plurality of said edges for detecting an object within said bay and activating said motor to open said lid in response to detection of said object, said sensor being recessed from said one of said plurality of edges by a distance within the range of about 0.001 inches to about 6 inches, whereby, said sensor is recessed to inhibit detection of an object beyond said inner periphery.

25. A trash enclosure as set forth in claim 24, wherein said inner periphery comprises an infrared absorptive coating.

26. A trash enclosure as set forth in claim 25, wherein said coating comprises black colored paint.

* * * * *